(12) United States Patent
Rappold

(10) Patent No.: US 6,273,801 B1
(45) Date of Patent: Aug. 14, 2001

(54) COMPOSITE HONING RING

(75) Inventor: Edgar Rappold, Baar (CH)

(73) Assignee: Rappold International Sales, Kusnacht (CH)

( * ) Notice: Subject to any disclaimer, the term of this patent is extended or adjusted under 35 U.S.C. 154(b) by 0 days.

(21) Appl. No.: 09/463,189

(22) PCT Filed: Nov. 10, 1998

(86) PCT No.: PCT/IB98/01824

§ 371 Date: Jan. 19, 2000

§ 102(e) Date: Jan. 19, 2000

(87) PCT Pub. No.: WO99/24203

PCT Pub. Date: May 20, 1999

(30) Foreign Application Priority Data

Nov. 10, 1997 (AT) .............................................. GM 701/97

(51) Int. Cl.[7] ...................................................... B24B 5/00
(52) U.S. Cl. ............................................ 451/253; 451/540
(58) Field of Search ................................. 451/47, 48, 56, 451/58, 540, 548, 541, 443, 437, 177, 178, 180, 189, 242, 243, 246, 253, 254

(56) References Cited

U.S. PATENT DOCUMENTS

| 1,924,380 | * | 8/1933 | Rideout | 451/47 |
| 4,707,950 | * | 11/1987 | Kawasaki | 451/541 |
| 5,221,294 | | 6/1993 | Carman et al. | |

FOREIGN PATENT DOCUMENTS

| 1 261 772 | | 2/1968 | (DE) . | |
| 2719524 | * | 12/1977 | (DE) | 451/47 |
| 0 506 640 | | 9/1992 | (EP) . | |
| 226533 | * | 8/1994 | (JP) | 451/47 |
| 100710 | * | 4/1995 | (JP) | 451/47 |
| 214423 | * | 8/1995 | (JP) | 451/47 |
| 252768 | * | 10/1996 | (JP) | 451/47 |

OTHER PUBLICATIONS

J. Falbe, M. Regitz, "Römpp Chemie Lexikon" Georg Thieme Verlag Stuttgart, New York.

* cited by examiner

Primary Examiner—Derris H. Banks
(74) Attorney, Agent, or Firm—Knobbe, Martens, Olson & Bear, LLP

(57) ABSTRACT

The invention relates to a composite honing ring comprising a honing part and a carrier part, whereby both components are made of different materials and can contain plastic resins in particular. The invention is characterized in that the abrasive honing part (1) has a low porosity, especially less than 5%, and preferably contains fibrous reinforcing elements. The carrier part has higher elasticity than the honing part. Since the carrier part is elastic, it damps machine vibrations and bearing vibration received by said carrier part.

12 Claims, 3 Drawing Sheets

COMPOSITE HONING RING

FIELD OF THE INVENTION

The present invention relates to composite honing rings consisting of an abrasive honing part (in the form of a gear tooth ring member) and a peripherally or internally arranged receiving ring, in the following designated as the carrier part, on which the honing part is mounted without any transition element.

BACKGROUND OF THE INVENTION

Honing rings as well as their uses have long been known in the field of gear tooth flank machining. They may be composed of different materials, the abrasive region mostly consisting of synthetic resin-bonded abrasive material, and the carrier rings being made of the same materials. The abrasive part has considerable porosity, which, for some applications, is artificially induced or increased by adding hollow spheres or ceramic agglomerates.

This combinated system corresponds to the effect of conventional grinding wheels, while, on the one hand, vibrations are transmitted to the work piece to be machined, and, on the other hand, the bore play causes inaccuracies which must be corrected for before utilisation, so as to make a stable honing process possible. Irregularities of the abrasive part require reinforcements, for honing rings without reinforcement tend to be subject to uncontrollable tooth breakage, and are thus not secure in their operation.

SUMMARY OF THE INVENTION

The invention aims at avoiding the above drawbacks, which is achieved according to the invention by a composite honing ring of the above kind, characterized in that the abrasive honing ring part has low porosity, in particular a porosity of less than 5%, and preferably contains fibrous reinforcing elements, and in that the carrier part has higher elasticity than the honing part.

This low porosity is achieved, for example, by compressing the honing part composition, e.g. by using hot-pressed epoxy resin. This reduction of porosity results in an increased strength, and it the same time the raggedness after indentation of the abrasive part is drastically reduced, which almost eliminates the tendency of chipping off the work pieces being honed and brings about high dimensional stability of the honing ring.

The fibrous reinforcing elements preferably used in particular have a length of 0,5 to 10 mm. Advantageously, such fibers may be whiskers and do not only reinforce the binder matrix, but in a further advantageous embodiment also participate in the machining of the work piece during honing—thus being abrasive—which results in additional smoothing of the work piece surface and thus an improvement of the surface quality. Whiskers are defined as fibrous single crystals of metals, oxides, borides, carbides, nitrides, polytitanate, carbon, etc., mostly of polygonal cross-section (see Römpp Chemie Lexikon, 9th edition, p. 5039, which is incorporated herein by reference).

The carrier part of the honing ring preferably consists of unfilled synthetic resin, in particular epoxy resin, which is why the materials of the abrasive honing ring part and the carrier part have different damping properties. The carrier part is elastic and causes damping of machine vibrations and bearing oscillations, which are absorbed by the carrier part. Thus the invention is able to achieve optimum honing results even in case of less stable machines and to prevent accumulating process forces.

According to a further preferred embodiment of the invention, the carrier part possesses flow properties under tension. When mounting the inventive part on a machine seat the carrier part encloses it without play, i.e. similar to a press fit. This provides for a very high truth of running, even in case the tools are repeatedly exchanged, as such a press fit is maintained.

In a preferred embodiment the abrasive honing ring part of the composite honing ring according to the invention is filled with abrasive grains, preferably consisting of corundum, SiC, metal nitrides, diamond and CBN grain, in particular having a grain size of $\leq 200$ μm, which makes efficient and uniform honing possible while at the same time keeping the wear of the honing ring low.

All the above properties taken together result in a good balance between costs and effectiveness, as in this way the honing ring has a much longer service life as compared to conventional honing rings. Service life is additionally prolonged by a reduction of the trueing cycles necessary, as well as by minimum adjustment values in the process of trueing.

Composition of the Honing Ring Members a) Reinforced honing part with indentation Components:

Polishing grains, 50–95% by weight, preferably corundum having an average grain diameter of 200 μm or less; alternatively SiC, diamond, CBN, metal carbides, nitrides and microcrystalline corundum;

binder (resins), 5–50% by weight, preferably epoxy resins;

fillers, 0–15% by weight, inorganic metal salts and/or oxides, organic fillers;

fibrous materials, 1–10% by weight, preferably having a length of 0.5–10 mm, made of glass, ceramics, carbon, plastics (e.g. aramides, amides, polyesters, etc.) and/or whiskers.

b) Carrier part

Components:

epoxide resins comprising different contents of curing agents, ranging from 0.02 to 0.3% by weight.

BRIEF DESCRIPTION OF THE DRAWINGS

In the following the invention will be described in more detail by way of examples with reference to the drawings.

FIG. 2 shows a honing ring wherein the abrasive honing part is outwardly arranged. FIG. 5 outlines a machine seat, not yet biased, on the carrier body of the honing ring. FIG. 6 shows the same arrangement as FIG. 5, the machine seat being biased here, though.

DETAILED DESCRIPTION OF THE INVENTION

Figure 1:
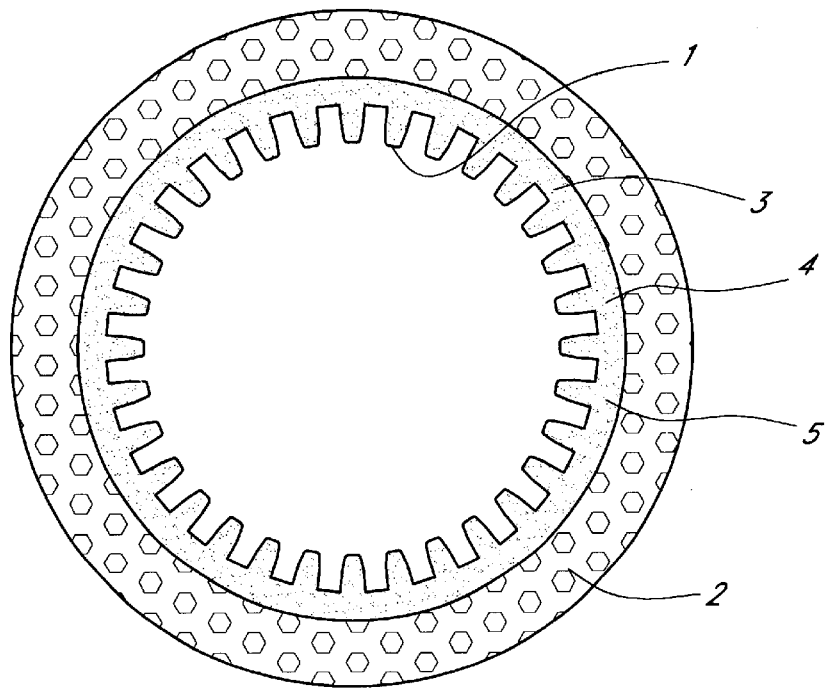
FIG. 1 illustrates a honing ring having an internal indentation.

FIG. 1 shows a honing ring having an internal honing part 1 and the carrier body 2 encircling it. Carrier body 2 consists of epoxy resin which preferably is not filled, showing flow properties under pressure. This feature makes it possible to mount the honing ring on the honing machine seat in such a way that it is utilizable even after minor trueing and immediately shows optimum concentric running properties. By releasing the bias of the machine flange, the press fit is removed and the honing ring may be withdrawn.

FIG. 1 also shows that honing part 1 is made of a grinding/polishing mass consisting of grinding grains 4, fibrous components 5 and resinous binding agent 3 and optional fillers. The components mentioned are listed under "composition of the honing ring members" and may be varied according to the type of material to be machined.

Figure 2:
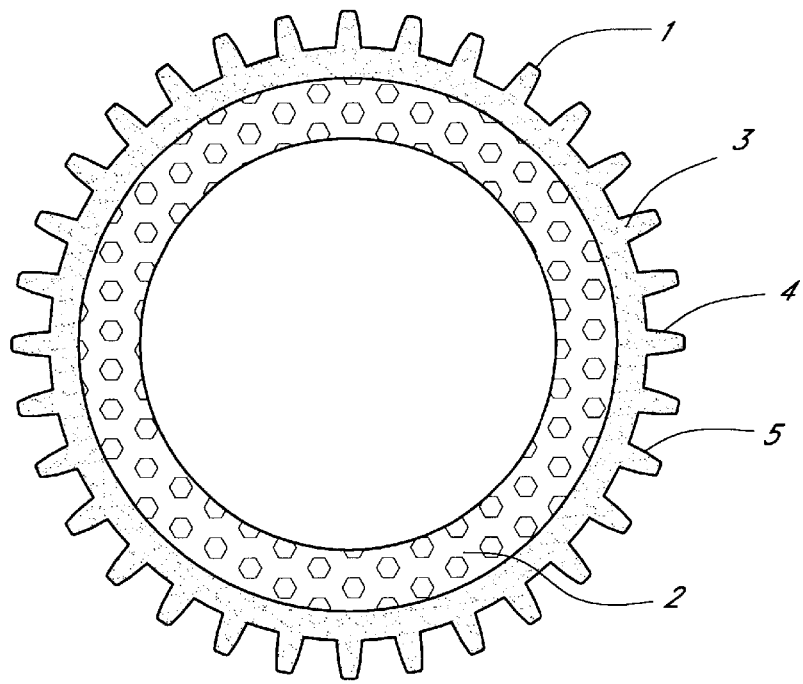
FIG. 2 shows a honing ring wherein an abrasive honing part is outwardly arranged.
Figure 3:
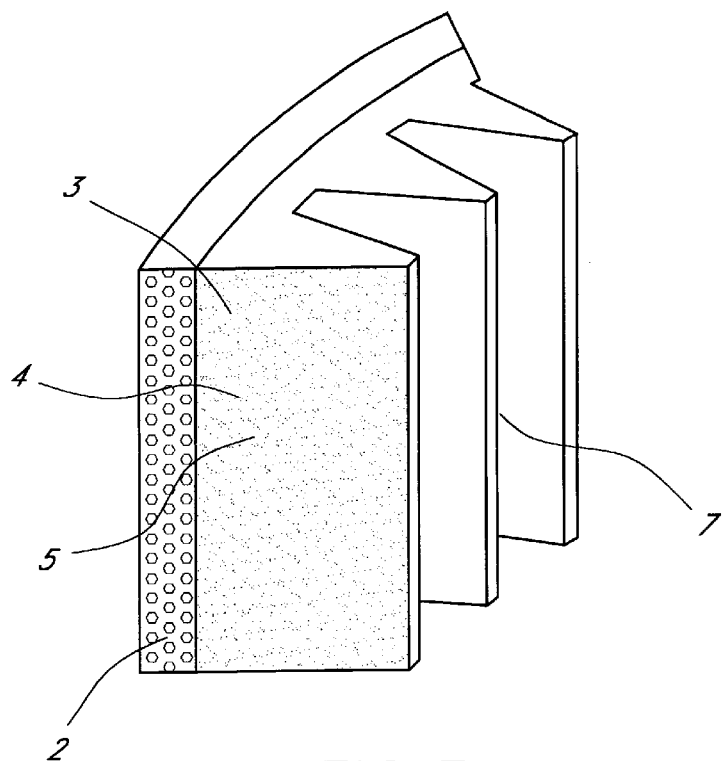
FIGS. 3 and 4 show corresponding cross-sections of honing rings.
Figure 4:
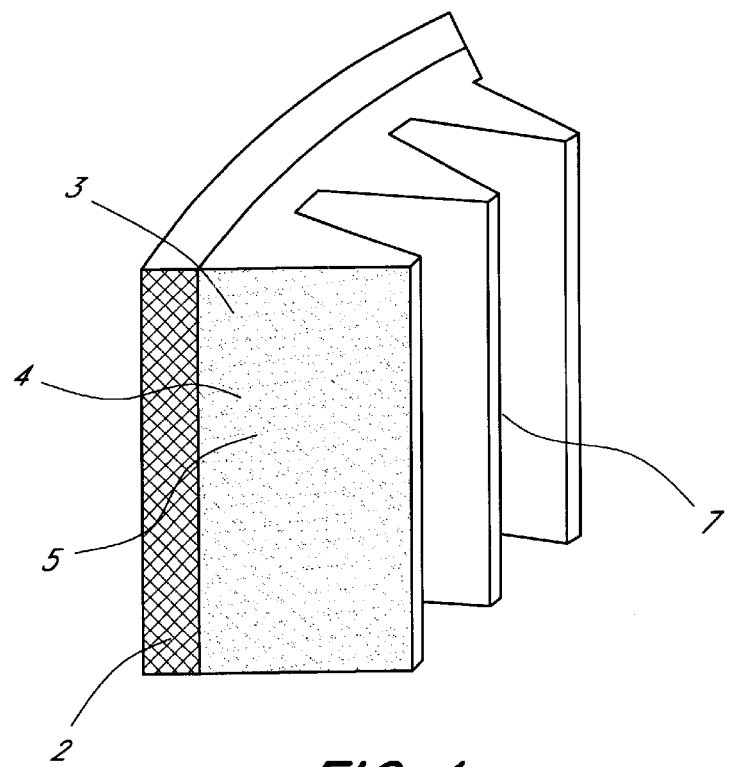

FIGS. 2, 3, and 4 show variants and sectional views of honing rings, respectively; the features described for FIG. 1 remain the same for all variants, though.

Figure 5:
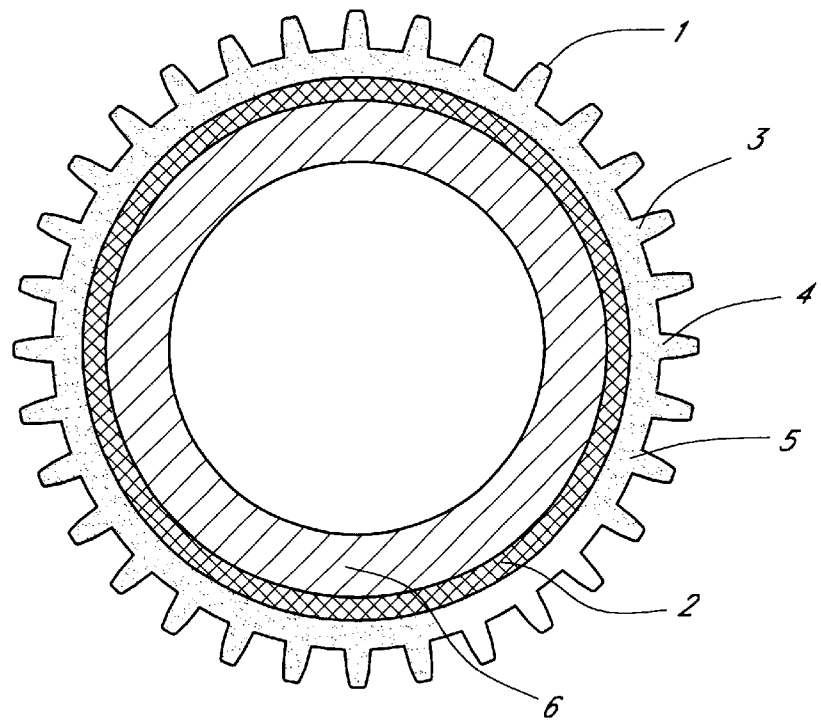
FIG. 5 shows a machine seat on a carrier body of the honing ring, wherein the machine seat is not biased.

FIG. 5 shows a honing ring having a metal machine seat 6, which is placed on the honing ring without exerting pressure. In this case, the honing ring bore, together with the flange bore form a cylindrical surface, i.e. the honing ring and the flange bore are flush. Mounting the honing ring on the seat (not shown) of the grinding machine drive can be accomplished easily without jamming.

Figure 6:
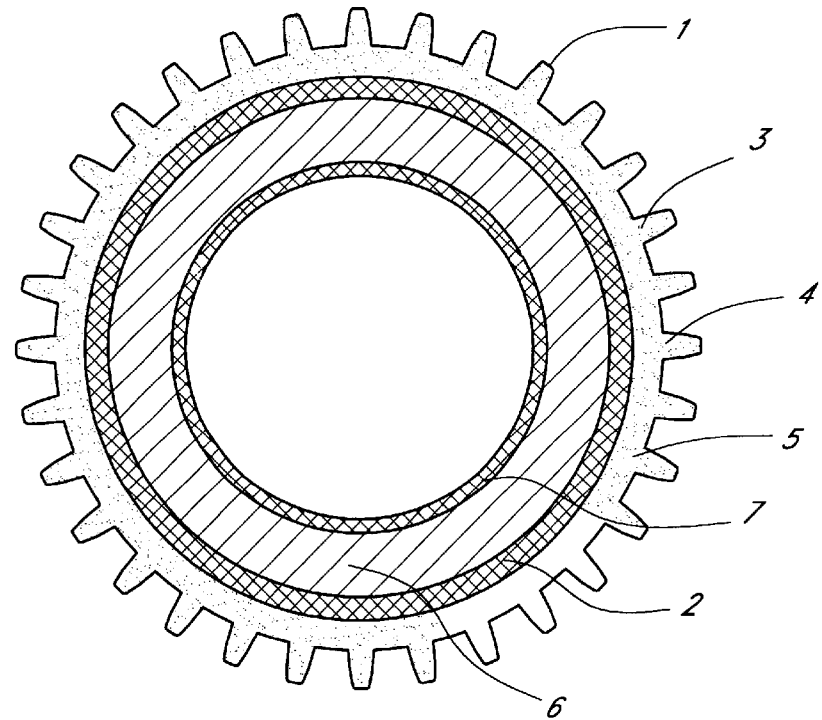
FIG. 6 shows a machine seat on the carrier body of the honing ring, wherein the machine is biased.

FIG. 6 shows the same honing ring as FIG. 5, the difference being that here machine seat 6 has been biased. In this case, elastic carrier body 2 is jolted, resulting in a slight reduction of the bore of the ring body (indicated by reference numeral 7 in FIG. 6). This deformation brings about the optimum fit of the honing ring on the seat, guaranteeing its superior running characteristics.

What is claimed is:

1. A composite honing ring comprising a honing part and a carrier part, wherein the two components are made of different materials and include synthetic resins, wherein the abrasive honing ring part has a porosity of less than 5% and includes fibrous reinforcing elements, and wherein the carrier part has higher elasticity than the honing part.

2. A composite honing ring, comprising:
an abrasive honing part of a first material having a predetermined porosity and a predetermined elasticity; and
a carrier part of a second material having an elasticity that is higher than the predetermined elasticity of the abrasive honing part, wherein the first and second materials are different and include synthetic resins.

3. A composite honing ring, comprising:
an abrasive honing part of a first material having a porosity of less than 5% and a predetermined elasticity; and
a carrier part of a second material having an elasticity that is higher than the predetermined elasticity of the abrasive honing part, wherein the first and second materials are different.

4. A composite honing ring, comprising:
an abrasive honing part of a first material including fibrous reinforcing elements and having a predetermined porosity and a predetermined elasticity; and
a carrier part of a second material having an elasticity that is higher than the predetermined elasticity of the abrasive honing part, wherein the first and second materials are different.

5. The composite honing ring of claim 4, wherein the reinforcing elements have a length of 0.5 to 10 mm.

6. The composite honing ring of claim 4, wherein the reinforcing elements are whiskers.

7. The composite honing ring of claim 4, wherein the reinforcing elements include abrasive material.

8. A composite honing ring, comprising:
an abrasive honing part of a first material having a predetermined porosity and a predetermined elasticity; and
a carrier part of a second material having an elasticity that is higher than the predetermined elasticity of the abrasive honing part, wherein the first and second materials are different and wherein the carrier part possesses flow properties under tension.

9. A composite honing ring, comprising:
an abrasive honing part of a first material having a predetermined porosity and a predetermined elasticity; and
a carrier part of a second material having an elasticity that is higher than the predetermined elasticity of the abrasive honing part, wherein the first and second materials are different, and wherein the second material includes unfilled synthetic resin.

10. The composite honing ring of claim 9, wherein the unfilled synthetic resin is epoxy resin.

11. A composite honing ring, comprising:
an abrasive honing part of a first material having a predetermined porosity and a predetermined elasticity, wherein the honing part is filled with abrasive grains selected from the group consisting of corundum, SiC, metal nitrides, diamond and CBN grains; and
a carrier part of a second material having an elasticity that is higher than the predetermined elasticity of the abrasive honing part, wherein the first and second materials are different.

12. The composite honing ring of claim 11, wherein the abrasive grains have a grain size of $\leq 200$ μm.

* * * * *